United States Patent [19]
Onodera et al.

[11] Patent Number: 5,911,147
[45] Date of Patent: Jun. 8, 1999

[54] ADDRESS CONTROLLER FOR APPARATUS WITH PLURAL EXTERNAL MEMORY SLOTS

[75] Inventors: Ken Onodera, Yokohama; Masahiko Murata, Tama, both of Japan

[73] Assignee: Canon Kabushiki Kaisha, Tokyo, Japan

[21] Appl. No.: 08/570,734

[22] Filed: Dec. 12, 1995

[30] Foreign Application Priority Data

Dec. 13, 1994 [JP] Japan .................................. 6-332518

[51] Int. Cl.$^6$ ...................................................... G06F 12/00
[52] U.S. Cl. ................................................ 711/5; 711/202
[58] Field of Search ................................ 395/405, 419, 395/829; 711/5, 209, 202

[56] References Cited

U.S. PATENT DOCUMENTS 5,305,445  4/1994  Nishikawa ............................... 395/400

*Primary Examiner*—Eddie P. Chan
*Assistant Examiner*—Kevin Verbrugge
*Attorney, Agent, or Firm*—Fitzpatrick, Cella, Harper & Scinto

[57] ABSTRACT

Disclosed is an address controller, for an external memory device, that neither performs bank switching nor uses the PIC and PID functions, and that operates normally, regardless of in which slot, among a plurality of slots, is loaded an external memory device wherein data that depends on an address is stored.

An address controller for external memory devices according to the present invention has the following arrangement. An address controller, for external memory devices, that controls a plurality of slots, in each of which is loaded an external memory device, comprises address space for virtual slots that are equal to or greater than the number of the plurality of slots, means for storing specific address data for the virtual slots in the external memory device, wherein an address for a slot into which the external memory device is inserted is assigned according to the address data for the virtual slots that are stored in the external memory device.

24 Claims, 13 Drawing Sheets

ADDRESS CONTROLLER FOR APPARATUS WITH PLURAL EXTERNAL MEMORY SLOTS

BACKGROUND OF THE INVENTION

1. Field of the Invention

The present invention relates to an address controller, for an external memory, that controls an address for an external memory (an emulation card or a font card) that is used for a printing apparatus, etc., and to an address controlling method.

2. Related Background Art

Conventionally, a fixed, absolute address is assigned as an address for an external memory device. However, when there are a plurality of slots for external memory devices and an absolute address is individually assigned to each slot, only a specific slot can be used to load an external memory device when a program, etc., that depends on an address of the external memory device is to be stored in the external memory.

To resolve this problem, 1) a method for bank switching, and 2) a method for the employment of PIC (Position Independent Coding) and PID (Position Independent Data) have been proposed.

In 1), the method for bank switching, an identical address is assigned to all the slots for the external memory devices, and the banks are switched when data in the external memory is to be accessed by a program for a system, so that a desired slot is selected. According to this method, no matter which slot the external memory device is loaded in, the head address that is assigned to the external memory device is the same. Thus, even for a program that requires a specific address, any slot is available to load the external memory device.

With this method, however, the banks must be frequently switched when a program for a system alternately accesses data held in a plurality of external memory devices that are loaded in a plurality of slots. In addition, this method can not be employed when a program, etc., for an external memory device that is loaded in one slot is to access data, such as font data, in an external device that is loaded in another slot.

As for 2), the method for the employment of PIC and PID, when PIC is employed, at the time a program is compiled, a relative address is used for a current address, instead of an absolute address, for the designation of an address in a program so that the program is not aware of an absolute address. When PID is employed, a relative address for the head address of the external memory device is used to designate the address that is written as data. The head address of the external memory device is held in a specific register when a program is to be executed, so that an absolute address for the address in data is acquired.

According to these methods, since the program is not aware of an absolute address, access is performed without any problem, regardless of which address slot the external memory device is loaded in. The head address of the slot for the external memory device is written in a predetermined register when the program of the system is to activate a program in the external memory, so that an absolute address can be acquired regardless of which slot the external memory device is loaded in.

A problem exists, however, in that it is difficult to directly access data in external memory from the program of the system. Since the address in the data in the system is not represented by an absolute address, during the data accessing, the program of the system must be aware of which slot is being accessed, while the program must regard the address in the program as a relative address or as an absolute address. Likewise, the same problem arises when a program of an external memory device accesses the data in the system or accesses the data in an external memory that is loaded in another slot. When it is necessary to designate a relative address, an extra code procedure is always required to enable the acquisition of an absolute address, and this degrades the performance. Since PIC and PID are functions of a compiler, the above described method can not be employed for a compiler that has no such functions.

SUMMARY OF THE INVENTION

To overcome the above described problems, it is a first object of the present invention to provide an address controller, for an external memory device, that neither performs bank switching nor uses the PIC and PID functions, and that operates normally, regardless of which slot, among a plurality of slots, is loaded with an external memory device wherein data (a program) that depends on an address is stored.

To achieve the above object, an address controller for external memory devices according to the present invention has the following arrangement. More specifically, an address controller, for external memory devices, that controls a plurality of slots, in each of which is loaded an external memory device, comprises:

address space for virtual slots that are equal to or greater than the number of the plurality of slots; and means for storing specific address data for the virtual slots in the external memory device, wherein an address for a slot into which the external memory device is inserted is assigned according to the address data for the virtual slots that are stored in the external memory device.

However, when the virtual slots are to be assigned to the respective external memory devices in this manner, many virtual slots must be prepared, otherwise they may be a shortage of slots. On the other hand, among data that are stored in an external memory device, there are also data, such as font data, that do not depend on an address at which address data are not stored.

It is a second object of the present invention to prevent the inefficient use of virtual slots, for external memory devices, in which data (font data) that do not rely on an address are stored. To achieve this object, an address controller for external memory according to the present invention has the following arrangement. More specifically, an address controller, for external memory devices, that controls a plurality of slots, in each of which is loaded an external memory device, comprises:

address space for a number of virtual slots that is equal to or greater than the number of the plurality of slots;

means for storing information, in the external memory device, that indicates whether or not data rely on an address; and means for storing specific address data for each of the virtual slots in the external device, wherein, relative to a slot in which is loaded an external memory device in which is stored data (a program) that rely on an address, address data, for each of the virtual slots that are stored in the external memory device, is employed to assign an address of the slot in which the external memory device is loaded, and wherein an address of an arbitrary unused virtual slot is assigned to a slot in which an external memory device, in which are data (font data) that do not rely on an address, is loaded.

When the external memory device is a programmable nonvolatile memory (e.g., flash PROM) that is in its initial state, a specific virtual slot does not have to be assigned to it because data (a program) that rely on an address have not yet been written in.

It is, therefore, a third object of the present invention to prevent the unnecessary use of virtual slots relative to external memory devices that consist of programmable nonvolatile memory that is in its initial state. To achieve the third object, the address controller for an external memory device according to the present invention has the following arrangement. More specifically, an address controller for external memory that controls a plurality of slots, in each of which an external memory device is loaded, and that is capable of reading and writing relative to an external memory device that consists of programmable nonvolatile memory, comprises:

address space for a number of virtual slots that is equal to or greater than the number of the plurality of slots;

means for recognizing whether or not the external memory device is nonvolatile memory in an initial state; and means for storing specific address data for a specific virtual slot, wherein, relative to a slot in which is loaded the external memory in which data (a program) that rely on an address are stored, an address of a slot in which the external memory device is loaded is assigned according to address data for a virtual slot that is stored in the external memory device, wherein an address for an arbitrary unused slot is assigned to a slot into which the nonvolatile memory in the initial state is inserted, and wherein the address data that is assigned is written at a predetermined position in the nonvolatile memory.

When the external memory device is programmable nonvolatile memory, even though a program that relies on an address is stored therein, as long as there are data for rewriting the data in the program, data are read and temporarily written into a RAM, and its address is written and stored in the nonvolatile memory in order to correct mismatch with the address of the slot.

It is, therefore, a fourth object of the present invention to rewrite an address in a program that is inserted into a slot that has a different address, to correct the address mismatch, and to enable the slot to be used with a new slot address. To achieve this object, an address controller for an external memory device according to the present invention has the following arrangement. More specifically, an address controller for a external memory, which has a plurality of slots, in each of which an external memory device is loaded, and which is capable of reading and writing relative to an external memory device that consists of programmable nonvolatile memory, wherein, when address data that are written in the nonvolatile memory differ from an address of a slot in which the nonvolatile memory is loaded, data for changing an address is employed to rewrite an address for a program in the nonvolatile memory, and to rewrite the address data in consonance with a current address for a slot.

When there is insufficient virtual slot space for distribution, an identical virtual slot is allocated basically for external memory devices (for example, devices for upgraded versions of the same program) that are not butted. However, the possibility cannot be eliminated that an external memory device, for which the identical virtual slot is distributed, will be loaded into a different slot.

It is, therefore, a fifth object of the present invention that, when an external memory device for which the same virtual slot is distributed is loaded into a different slot, a slot into which an external memory device that has a higher priority is loaded is validated, and a slot into which an external memory that has a lower priority is loaded is invalidated. To achieve this object, an address controller for an external memory device according to the present invention has the following arrangement. More specifically, an address controller, for external memory devices, that has a plurality of slots in each of which one of the external memory devices is loaded, comprises:

means for storing specific address data for the virtual slots in the external memory device; and means for storing a priority order for the external memory device in the external device, wherein, when address data for each of the virtual slots that are stored in each of the external memory devices, are employed to distribute an address to the slot into which the external memory device is loaded, and when the allocation of an identical virtual slot space address is required for a plurality of slots, a designated address is allocated to a slot that has the highest priority, according to the priority order, and other, remaining slots are invalidated.

When, again, there is insufficient virtual slot space for distribution, another external memory device, for which the same virtual slot is allocated is loaded in a different slot, and either slot is invalidated. It is, therefore, a sixth object of the present invention that, when an external memory device for which the same virtual slot is allocated is loaded in a different slot, both external memories can be accessed.

To achieve this object, an address controller for an external memory device according to the present invention has the following arrangement. More specifically, an address controller, for external memory devices, that has a plurality of slots to each of which one of the external memory devices is loaded, comprises:

address space for a number of virtual slots that is equal to or greater than the number of the plurality of slots;

means for storing specific address data for the virtual slots in the external memory device; and means for storing a bank number for each of the external memory devices in the external memory device, wherein, when the address data for each of the virtual slots that are stored in the external memory are employed to assign an address for a slot in which the external memory device is loaded, and when assignment of an identical virtual slot space address is required for a plurality of slots, a designated slot is allocated for all slots of the plurality of slots, the bank number for each of the slots is held, and in response to a bank switching command from a program for a system, the plurality of slots for the identical address is allocated.

DETAILED DESCRIPTION OF THE PREFERRED EMBODIMENTS

Preferred embodiments of the present invention will now be described while referring to the accompanying drawings.

(First Embodiment)

Figure 1:
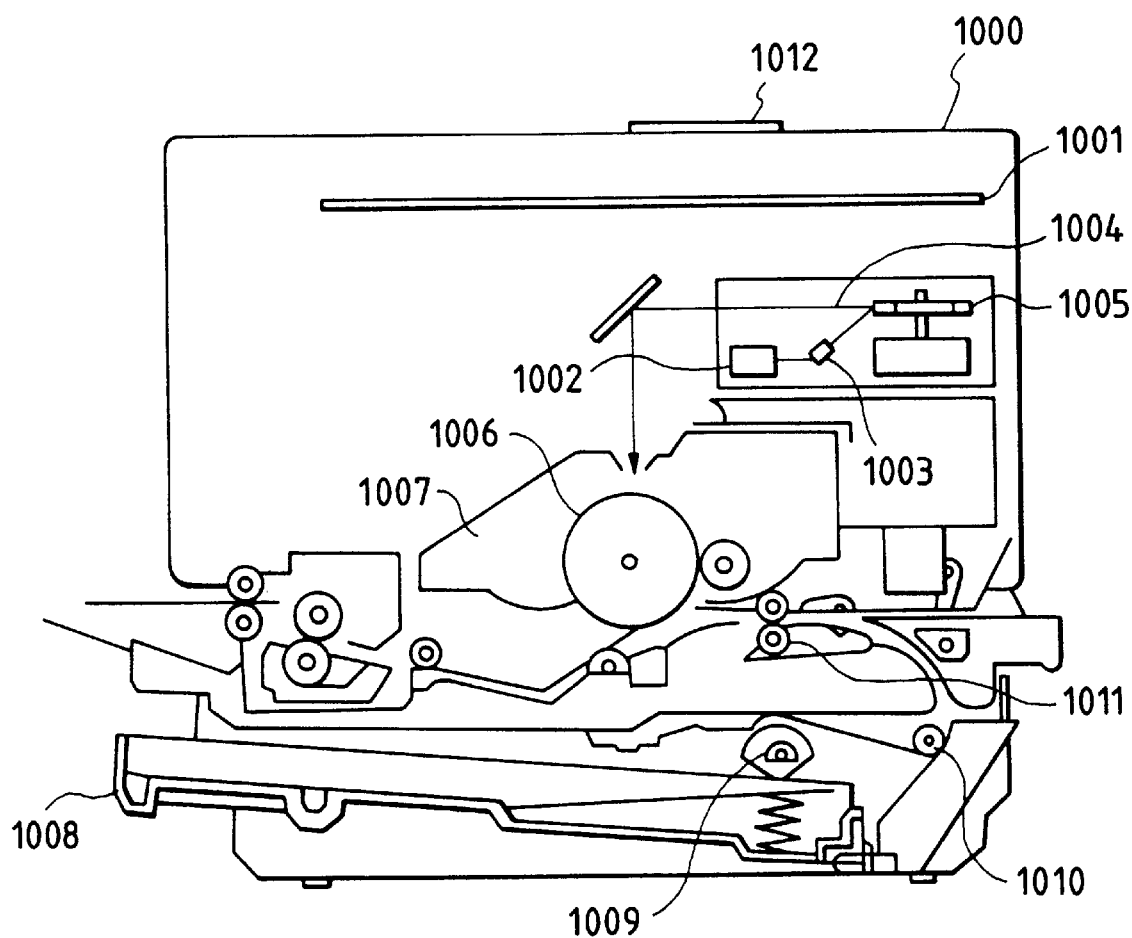
FIG. 1 is a cross sectional view for explaining the arrangement of a printing apparatus to which the present invention can be applied.

FIG. 1 is a cross sectional view of the internal structure of a laser beam printer (hereafter referred to as an "LBP") that is employed in a first embodiment. A character pattern or a standard form (form data) from a data source (not shown) can be registered in the LBP. In FIG. 1, an LBP main body 1000 receives character data (character code), form data, or macro commands from a host computer (not shown) that is externally connected, and stores these data. In addition, the LBP main body 1000 creates a character pattern, or a form pattern, that corresponds to these data, and forms an image on a recording sheet, which is a recording medium.

On a console panel 1012 are provided switches for manipulation and an LED display. A printer control unit 1001 controls the entire LBP 1000, and analyzes character data that are transmitted from the host computer. The control unit 1001 mainly converts the character data into video signals having a corresponding character pattern, and outputs the video signals to a laser driver 1002, which is a circuit for driving a semiconductor laser 1003. In consonance with the received video signals, the laser driver 1002 switches a laser beam 1004, which is emitted by the semiconductor laser 1003, on and off. The laser beam 1004, which is reflected to the right and to the left by a rotary multi-plane mirror 1005, scans an electrostatic drum 1006.

As a result, an electrostatic latent image of a character pattern is formed on the electrostatic drum 1006. This latent image is developed by a developing unit 1007, which is partially fitted around the circumference of the electrostatic drum 1006, and is transferred to a recording sheet. A cut sheet is employed as the recording sheet. The cut sheets are stored in a paper cassette 1008 that is attached to the LBP 1000, and inside the apparatus are fed to the electrostatic drum 1006 by a feed roller 1009 and delivery rollers 1010 and 1011.

Figure 2:
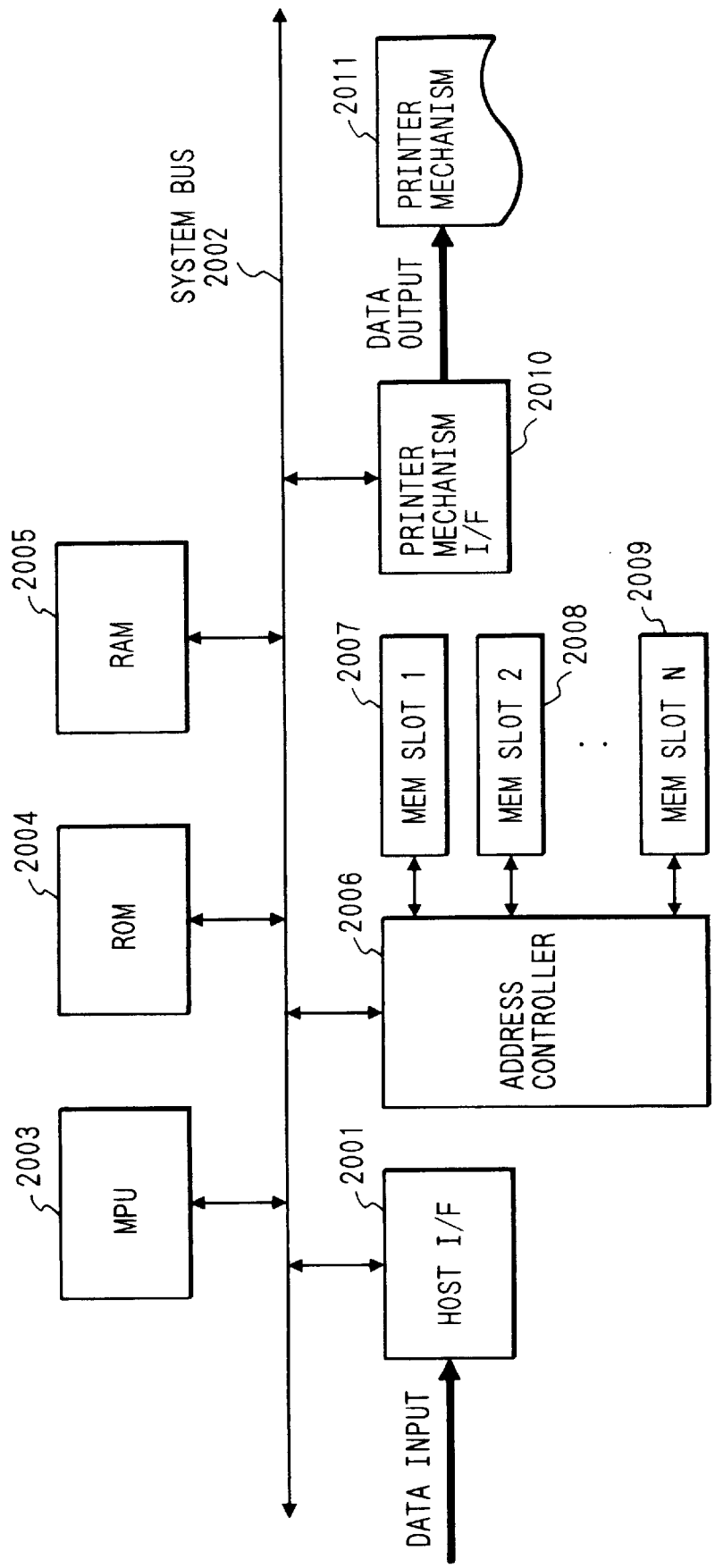
FIG. 2 is a block diagram for explaining the control system of a printing apparatus according to one embodiment of the present invention.

FIG. 2 is a schematic block diagram illustrating the arrangement of the LBP 1000 shown in FIG. 1, mainly with the arrangement of the printer control unit 1001. In FIG. 2, a host interface 2001 receives print data from a host computer (not shown) and temporarily holds the data in a reception buffer. A system bus 2002 is employed to join together an MPU, a RAM, a ROM, memory slots, and a printer mechanism interface, which will be described later. An MPU 2003 controls the printer control unit 1001 and the entire laser printer 1000 in consonance with a program that will be described later. A ROM 2004 is employed to store a program for operating a series of control means, which will be described later, and programs that are shown in FIGS. 7 through 10, in FIGS. 14 and 15, and in FIG. 18. A RAM 2005 is employed as a work area when the MPU 2003 executes the program. An address controller 2006 controls addresses for memory slots 1 through n, 2007, 2008 . . . 2009, in which external memory is loaded. A printer mechanism interface 2010 receives an image output command from the MPU 2003 and outputs image data to a printer mechanism (laser printer) 2011. An external memory is employed for a font memory in which fonts are stored, and an emulation memory in which an emulation program for controlling the printing process of the printer is stored.

Figure 3:
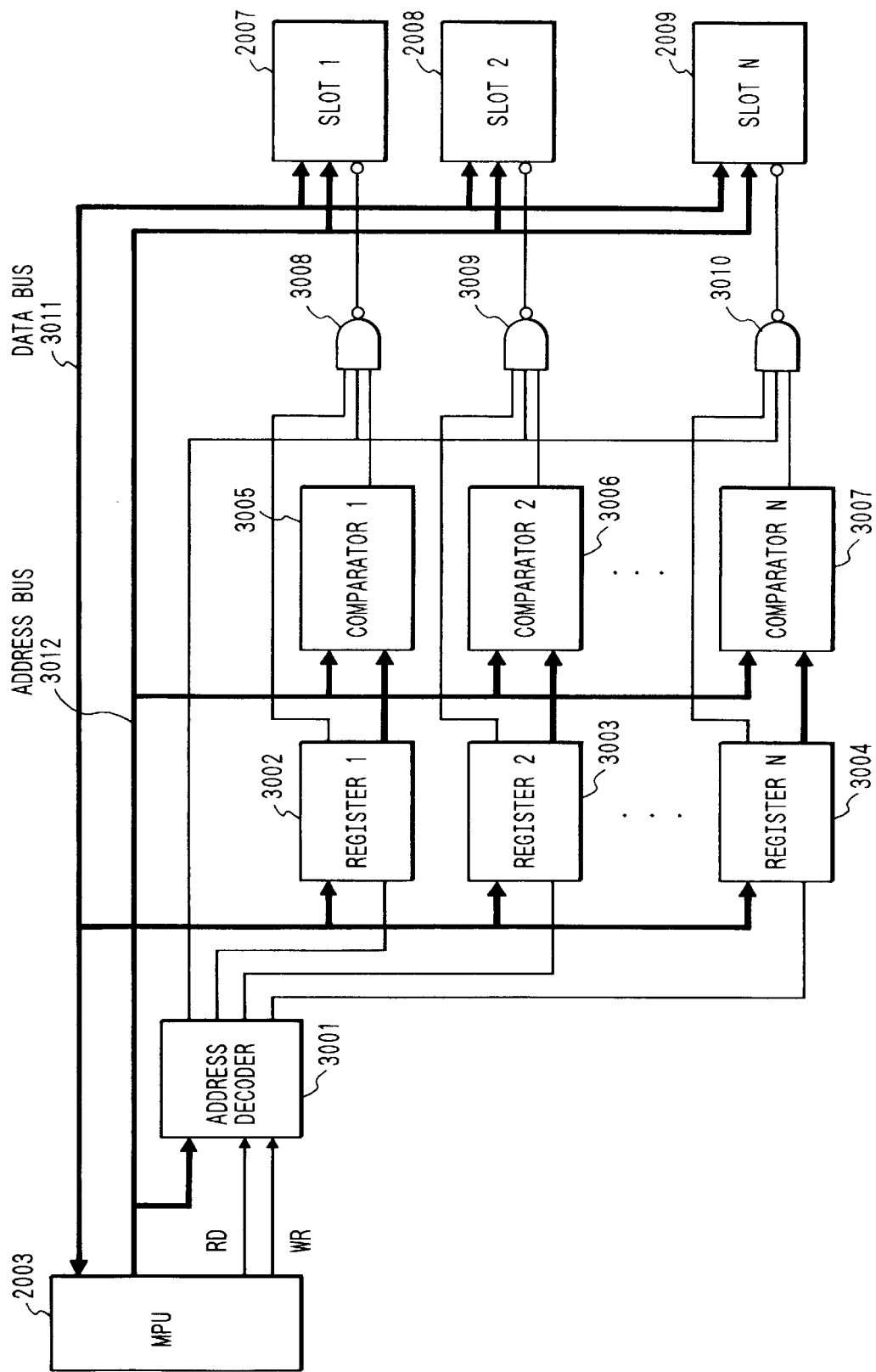
FIG. 3 is a detailed block diagram for explaining an address controller shown in FIG. 2.
Figure 4:
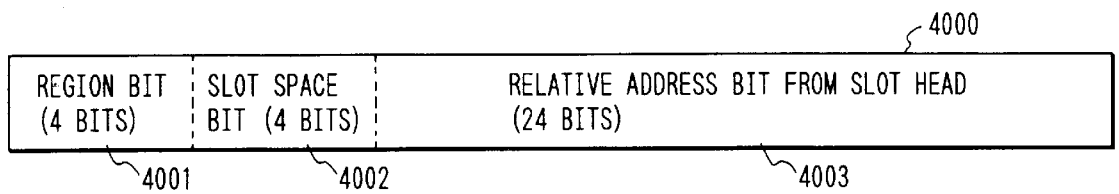
FIG. 4 is a detailed diagram for explaining address data that are transmitted across an address bus shown in FIG. 3.

FIG. 3 is a detailed block diagram illustrating the address controller 2006. The system bus 2002, which connects the MPU 2003 to the address controller 2006, consists of a data bus 3011, an address bus 3012, and signal lines for various control signals, such as an RD signal and a WR signal. When the MPU 2003 accesses an external memory device that is loaded in one of the slots 2007 through 2009, a 32-bit address 4000, which is shown in FIG. 4, is transmitted across the address bus 3012. The address 4000 includes region bits (4 bits) 4001, slot space bits (4 bits) 4002, and relative address bits (24 bits) 4003 from a slot head.

Figure 6:
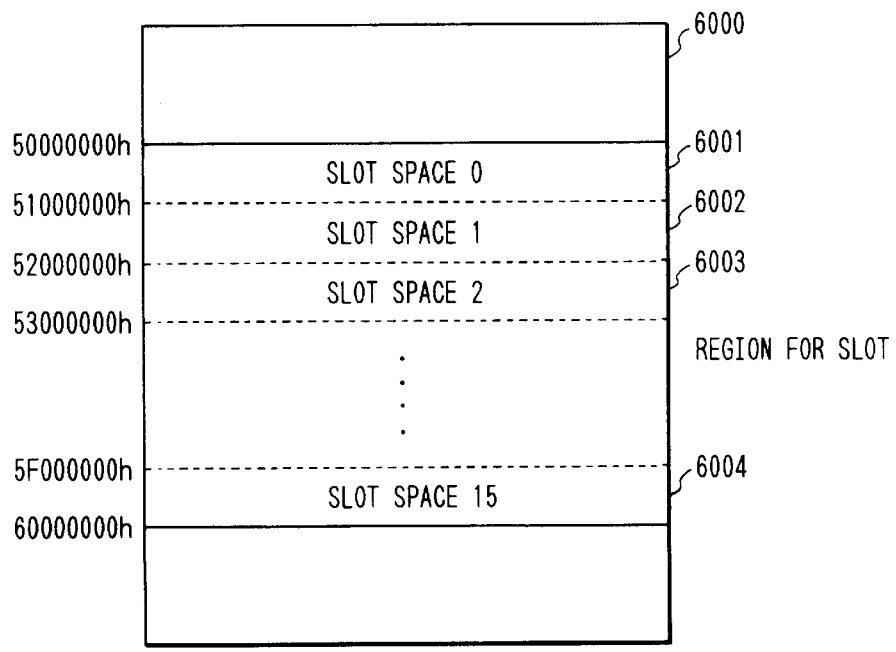
FIG. 6 is a diagram for explaining an address map of the controller shown in FIG. 2.
Figure 7:
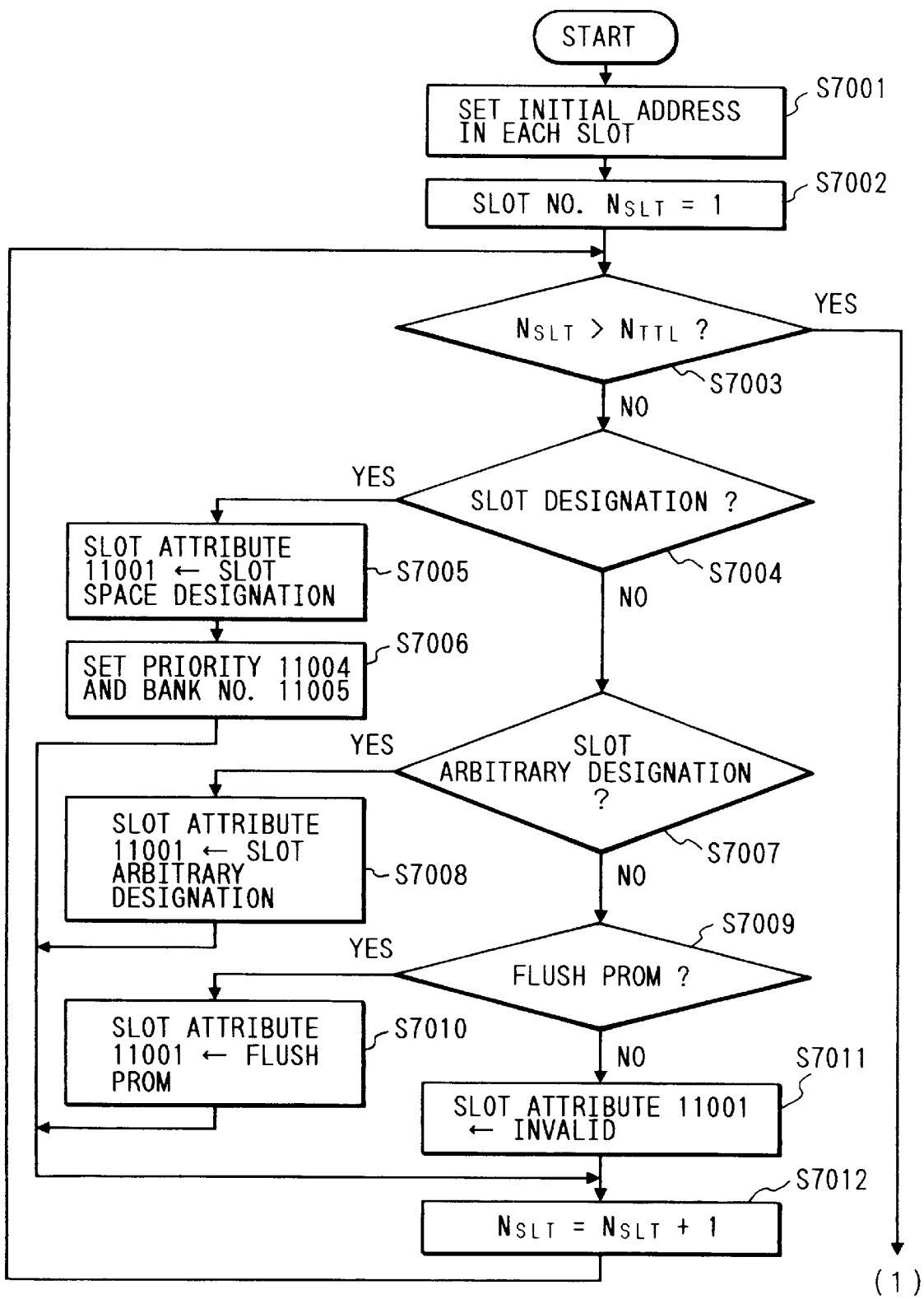
FIG. 7 is a flowchart showing the operational procedures, at the time of booting, of a printing apparatus according to a first embodiment of the present invention.

An address decoder 3001 determines whether or not the address that is carried across the address bus 3012 is for the slot region. For example, as is shown in an address map 6000 in FIG. 6, among addresses 0 to 0A11Fh that are carried across the address bus 3012, the address decoder determines that only an address whose region bits (4 bits) 4001 are 0101b, i.e., only an address that belongs to an address space 50000000h to 5FFFFFFFh, is an address for a slot, and transmits a true signal to AND gates 3008 through 3010.

Figure 5:
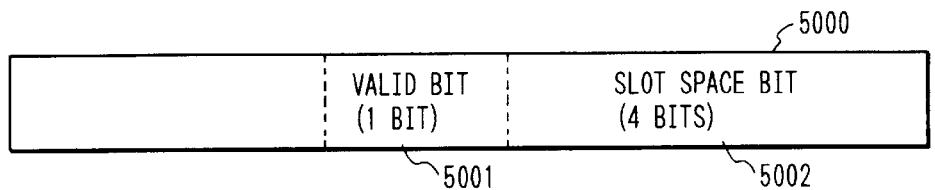
FIG. 5 is a detailed diagram for explaining the data that are held in a register that manages a slot shown in FIG. 3.

Addresses that are carried across the address bus 3012 are also transmitted to comparators 1 through n, 3005 through 3007. Each of these comparators 3005 through 3007 compares the slot space bits (4 bits) 4002 with the slot space bits (4 bits) 5002 of the register data 5000 shown in FIG. 5, which are set in the registers 1 through n, 3002 through 3004. A comparator 3005 to 3007, which finds that the two bit sets match, sends a true signal to one of the AND gates 3008 through 3010. In this manner, for one among the slot spaces 6001 through 6004 shown in the address map 6000, a true signal is transmitted to an AND gate for a slot to which the slot space that corresponds to the address is allocated.

Data 5000 are written to the registers 3002 through 3004 in the following manner. More specifically, when the address decoder 3001 determines that an address that is carried across the address bus 3012 corresponds to one of the registers 3002 through 3004 and transmits a WR signal to it, the data that are to be written are supplied from the MPU 2003, via the data bus 3011, to a corresponding register 3002 to 3004.

The data 5000 that are to be written to one of the registers 3002 through 3004 includes the slot space bits (4 bits) 5002 and a slot valid bit (1 bit) 5001. The slot space bits 5002 designate one of the slot spaces 6001 through 6004 that are shown in the address map 6000, and thus, a slot space address is assigned to a slot. The data item represented by the slot valid bit 5001 is transmitted as a true or false signal to the AND gates 3008 through 3010.

The AND gates 3008 through 3010 receive the signals from the address decoder 3001, the signals from the comparators 3005 through 3007, and the valid bit signals from the registers 3002 through 3004, respectively. Only when all the received signals are true, does one of the AND gates 3008 through 3010 transmit a true signal to a corresponding slot 1 to n, 2007 to 2009.

When a signal from a corresponding AND gate is true, a slot receives the relative address bits (24 bits) 4003 from the slot head among the addresses that are carried across the address bus 3012. That address is employed as relative address data from the head of external memory that is loaded into the slot for accessing data at a designated address in the external memory. Then, in response to an RD signal and a WR signal, the slot exchanges data with the MPU 2003 via the data bus 3011.

As is described above, the data can be accessed at a valid slot for which is assigned a slot space address that corresponds to an address. The operation of the MPU 2003 of the laser beam printer 1000 that incorporates the thus arranged printer control unit 1001 will be explained while referring to the flowchart in FIG. 7.

First, when power is supplied from a power source (not shown), at step S7001 the MPU 2003 assigns an initial address for each of n slots 2007 through 2009 for external memory. In this embodiment, slot space 0 (6001) (50000000h to 50FFFFFFh) is assigned for slot 1 (1007); slot space 1 (6002) (51000000F to 51FFFFFFh) is assigned for slot 2 (2008); and slot space n−1 (5(n−1)000000h to 5(n−1)FFFFFF) is assigned to slot n (2009). The assignment of slot space k−1 for slot k (0≦k≦n−1) can be accomplished by writing the valid bit 5001 of "1" and the slot space bit 5002 for "K−1" in the register k.

Figure 11:
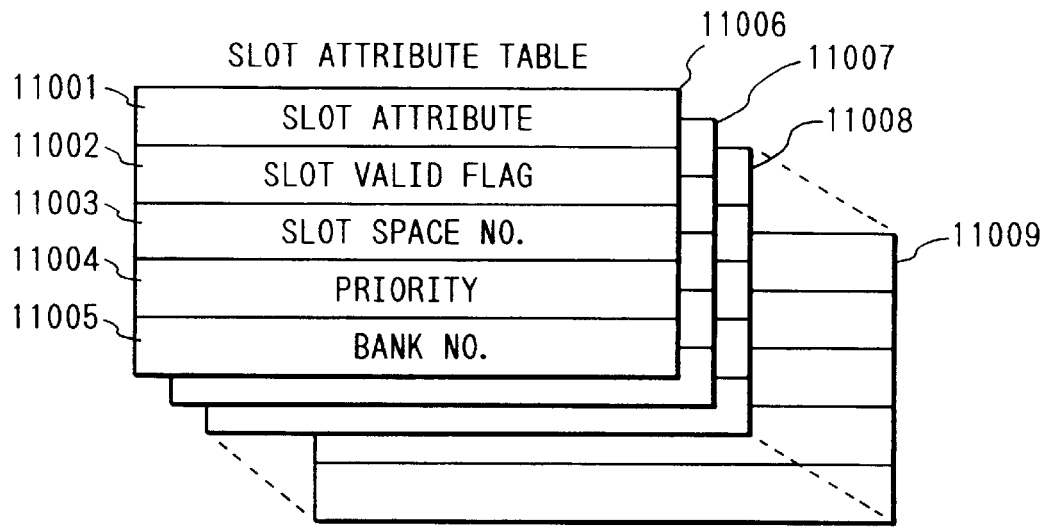
FIG. 11 is a schematic diagram showing a management table that is stored in a RAM to manage external memory slots of the printing apparatus in this embodiment.
Figure 12:
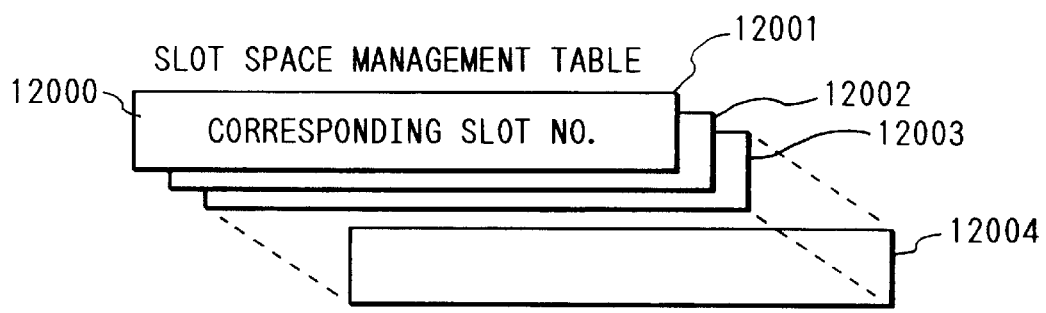
FIG. 12 is a schematic diagram showing a management table that is stored in a RAM to manage slot space addresses of the printing apparatus in this embodiment.

As the initialization process, a slot attribute 11001 in one of those slot attribute tables in FIG. 11, each of which corresponds to an individual slot space, is initialized to 0x00000000 (invalid), and a slot valid flag 11002 is set to OFF. A corresponding slot number 12000 in one of those slot space management tables in FIG. 12, each of which corresponds to an individual slot space, is initialized to 0 (blank).

At step S7002, the MPU 2003 sets "1" as an initial value for a slot number variable $N_{SLT}$ in the RAM 2005, which is a program work area. Then, at step S7003, the MPU 2003 compares the slot number variable $N_{SLT}$ with the number of slots $N_{TTL}$. When the variable $N_{SLT}$ is greater than the number $N_{TTL}$, the process for all the slots is terminated, and program control shifts at (1) to a process shown on the following page.

Figure 13:
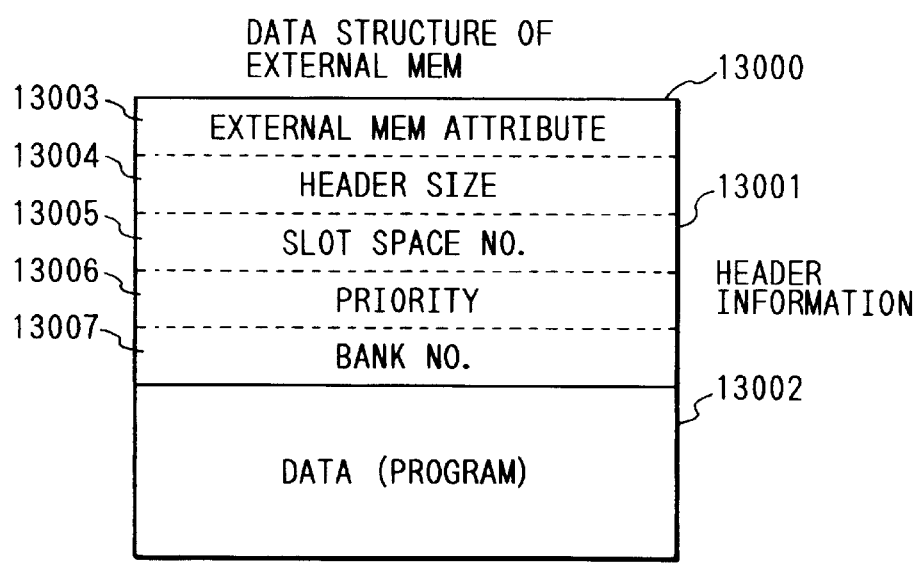
FIG. 13 is a diagram showing an example format for data stored in an external memory device for the printing apparatus according to this embodiment.

If, at step S7003, the MPU 2003 determines that the slot number variable $N_{SLT}$ is equal to or smaller than the number of slots $N_{TTL}$, at step S7004, the MPU 2003 accesses an external memory 13000 in FIG. 13 that is loaded into a slot that is designated by the slot number variable. The external memory 13000 consists of an external memory header information section 13001, and a section 13002 in which are actual data, such as programs and font data. The external memory header information section 13001 includes external memory attribute data 13003, a header size 13004, a slot space number 13005, a priority 13006, and a bank number 13007.

Included with the external memory attribute data 13003 in the external memory are the following attribute data. When the value for these 4 byte data is 0x00000001, it means that the external memory is designated with a slot space number. When the 4 byte data are 0x00000002, it represents an external memory whose slot space number is arbitrarily designated (an external memory that does not rely on the slot space address). When the value of the 4 byte data is 0xFFFFFFFF, it means that the external memory is a programmable nonvolatile memory, such as flash PROM, and has not yet been initialized (all data are 0xFF).

At step S7004, the MPU 2003 accesses the external memory in the slot and acquires the external memory attribute data 13003. If the external memory attribute data 13003 indicates an external memory that is designated by the slot space number 0x00000001, program control advances to step S7005. At step S7005, the slot space number 13005, the priority 13006, and the bank number 13007 are acquired. Then, among the attribute tables 11006 through 11009 in FIG. 11, for the individual slots, that are stored in the RAM 2005, which is a program work area, the slot attribute 11001 in the slot attribute table that corresponds to a slot that is currently referred to is set to the designation for the slot space (0x00000001), and the slot space number 11003 is set.

At step S7006, the CPU 2003 sets the priority 11004 and the bank number 11005. Since the address assignments for the slots have not actually been performed yet, the slot valid flag 11002 is maintained OFF. Program control goes to step S7012, whereat the slot number variable is incremented. Program control then returns to step S7003.

If, at step S7004, the MPU 2003 determines that the external memory attribute data 13003 do not indicate memory for which a slot space number is designated, program control moves to step S7007. A check is then performed to determine whether or not the external memory data 13003 indicates an arbitrary designation (0x00000002) of a slot number. When the attribute data 13003 indicate the arbitrary designation of a slot number, program control goes to step S7008.

At step S7008, the MPU 2003 loads the slot number arbitrary designation (0x00000002) in the slot attribute 11001 in the slot attribute table that corresponds to a slot that is currently being referred to. Since the assignment of addresses to slots has not actually been performed yet, the slot valid flag 11002 is set OFF. Program control then moves to step S7012, whereat the slot number variable is incremented. Program control then returns to step S7003.

When, at step S7007, the MPU 2003 determines that the external memory attribute data 13003 do not indicate a memory for the arbitrary designation of a slot number, program control goes to step S7009, whereat a check is performed to determine whether or not the external memory attribute data 13003 indicates flash PROM (0xFFFFFFFF) that is in the initial state. If the attribute data indicates flash PROM that is in the initial state, program control moves to step S7010.

At step S7010, the MPU 2003 writes the attribute data for flash PROM (0xFFFFFFFF) in the initial state to the slot attribute 11001 in the slot attribute table that corresponds to a slot that is currently being referred to. Since the assignment of addresses to the slots has not actually been performed yet, the slot valid flag 11002 is set to OFF. Program control advances to step S7012, whereat the slot number variable is incremented. Program control then returns to step S7003.

If, at step S7009, the MPU 2003 determines that the external memory attribute data do not indicate flash PROM that is in the initial state, program control goes to step S7011. At step S7011, the external memory in this slot is determined to be invalid, and the invalid number code (0x00000000) is written to the slot attribute 11001 in the slot attribute table that corresponds to a slot that is currently being referred to. The slot valid flag 11002 is also set OFF. Program control then advances to step S7012, whereat the slot number variable is incremented, and program control returns to step S7003. In this manner, information, such as the attributes for all the external memories that are inserted into the slots can be read and written to the corresponding slot attribute tables.

Figure 8:
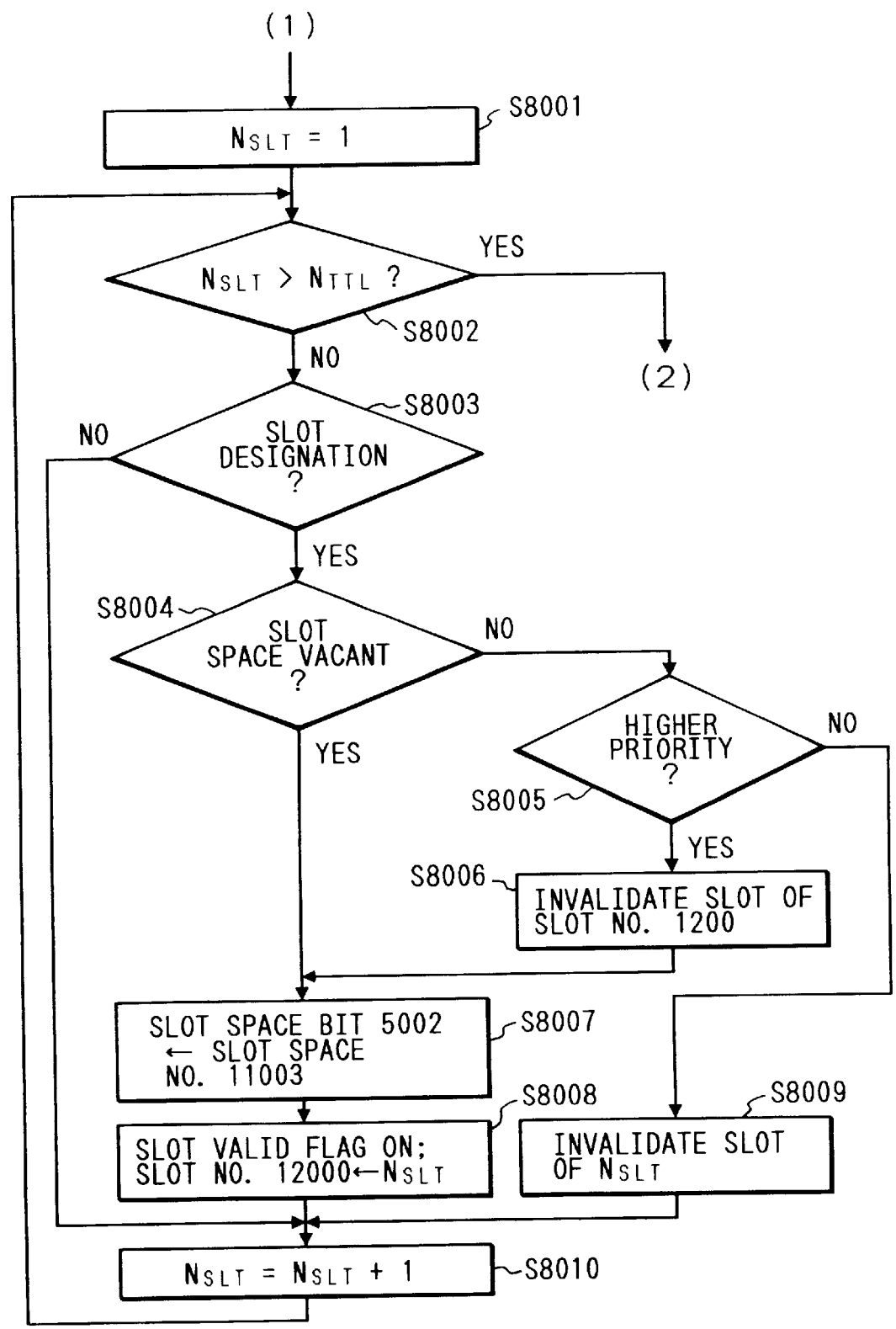
FIG. 8 is a flowchart showing the operational procedures, at the time of booting, of the printing apparatus according to the first embodiment of the present invention.
Figure 9:
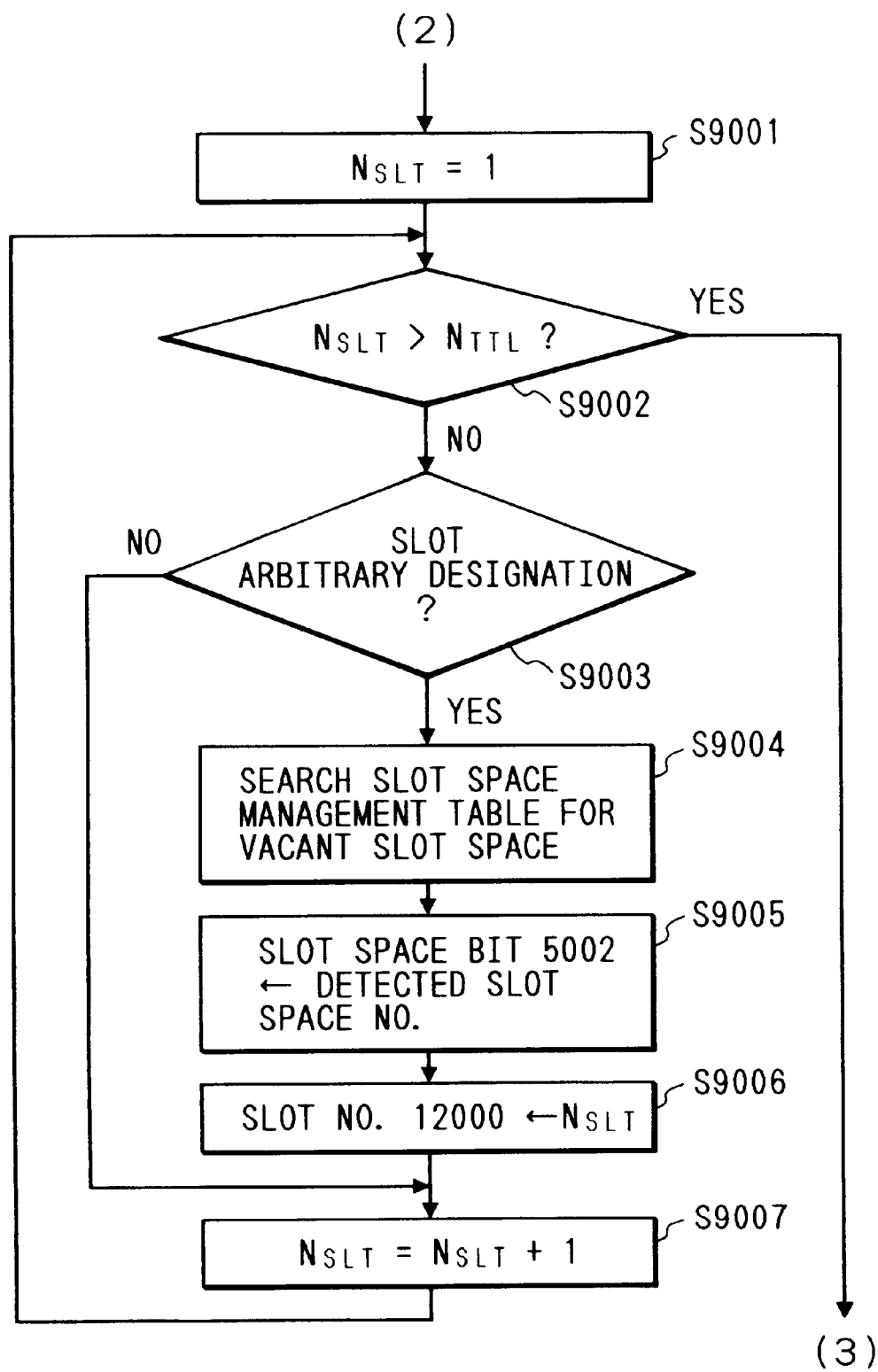
FIG. 9 is a flowchart showing the operational procedures, at the time of booting, of the printing apparatus according to the first embodiment of the present invention.

When, at step S7003, the MPU 2003 determines that the reading of all the slots has been completed, program control shifts at (1) to step S8001 in FIG. 8. At step S8001, the above mentioned slot number variable $N_{SLT}$ is initialized to "1" again. Then, at step S8002, a check is performed to determine whether or not the slot number variable $N_{SLT}$ is greater than the total number of slots $N_{TTL}$. When the slot number variable $N_{SLT}$ is greater than the total slots $N_{TTL}$, the process for all the slots is terminated, and program control shifts at (2) to a process on the following page.

When, at step S8002, the MPU 2003 determines that the slot number variable $N_{SLT}$ is equal to or smaller than the total number of slots $N_{TTL}$, program control advances to step S8003. The MPU 2003 accesses the slot attribute 11001 in the slot attribute table that corresponds to the slot number that is written in the slot number variable, and determines whether or not the slot attribute 11001 indicates the designation (0x00000001) for a slot space number. If the slot attribute 11001 does not indicate the designation for a slot space number, program control goes to step S8010, whereat the slot number variable is incremented. Program control then returns to step S8002.

If, at step S8003, the MPU 2003 determines that the slot attribute 11001 indicates the designation of a slot space number, at step S8004 the slot space number 11003 is acquired, a corresponding slot number 12000 in the slot management table (FIG. 12), which corresponds to the slot space that is designated by the slot space number, is acquired, and a check is performed to determine whether or not the corresponding slot number 12000 is blank (0).

When the corresponding slot number 12000 is blank (0), program control goes to step S8007, whereat the slot space number 11003 in the slot attribute table that is currently being referred to is written in the slot space bits 5002, and the valid bit 5001 is set to "1". The MPU 2003 writes these data in the register that corresponds to a slot that is currently being referred to (the slot with a slot number that is set to the slot number variable).

Following this, at step S8008, the MPU 2003 sets the slot valid flag in the slot attribute table that is currently being referred to ON, and a slot number that is set for a current slot number variable is written to the corresponding slot number 12000 in the slot space management table that corresponds to the slot space that is designated at step S8007. Program control moves to step S8010, whereat the slot number variable is incremented, and then returns to step S8002.

If, at step S8004, the MPU 2003 determines that the slot space is not blank (the slot space is already assigned to one of the slots), at step S8005, the MPU 2003 compares the priority 11004 in the slot attribute table that is currently referred to with the priority 11004 of the slot attribute table that corresponds to a slot that is designated by the corresponding slot number 12000.

When a higher priority is given to the slot attribute table that is currently referred to (the value of the priority is greater), at step S8006 the valid bit 5001, of the register that manages the slot that is designated by the corresponding slot number 12000 that is set in the slot space management table, is set to "0" to invalidate the slot, and the slot valid flag 11002 of the slot attribute table that corresponds to that slot is set to OFF. Program control then goes to step S8007.

If, at step S8005, the MPU 2003 determines that the priority for the slot attribute table that is currently referred to is lower (the priority value is smaller), program control moves to step S8009, whereat the slot valid flag 11002 of the slot attribute table that is currently referred to is set to OFF. Program control then advances to step S8010.

In the above described manner, the slot space can be allocated for the slots for which the slot numbers are designated. When the process for all the slots is terminated at step S8003, program control shifts at (2) to step S9001, and at step S9001 the above mentioned slot number variable is initialized to "1" again.

Then, at step S9002, the MPU 2003 compares the slot number variable $N_{SLT}$ with the total number of slots $N_{TTL}$. When the slot number variable $N_{SLT}$ is greater than the total slots $N_{TTL}$, the process for all the slots is terminated, and program control shifts at (3) to a process on the following page. When, at step S9002, the MPU 2003 determines that the slot number variable $N_{SLT}$ is equal to or smaller than the total number of slots $N_{TTL}$, program control advances to step S9003. The MPU 2003 accesses the slot attribute 11001 in the slot attribute table that corresponds to the slot number that is set to the slot number variable, and determines whether or not the slot attribute 11001 indicates the arbitrary designation (0x00000002) of a slot space number. If the slot attribute 11001 does not indicate the arbitrary designation of a slot space number, program control goes to step S9007, whereat the slot number variable is incremented. Program control then returns to step S9002.

If, at step S9003, the MPU 2003 determines that the slot attribute 11001 indicates the arbitrary designation of a slot space number, at step S9004 the MPU 2003 accesses the slot space management table from the beginning in order to search for a slot space whose corresponding slot number 12000 is blank (0).

At step S9005, the slot space number 11003 for a blank slot number for which a search has been performed is written to the slot space bits 5002, and the valid bit 5001 is set to "1". The MPU 2003 sets these data in the register that corresponds to a slot that is currently being referred to (the slot with a slot number that is set to the slot number variable). Following this, the slot valid flag 11002 of the slot attribute table that corresponds to that slot is set to ON.

At step S9006, the MPU 2003 sets a current slot number to the corresponding slot number 12000 in the slot space management table. At step S9007, the MPU 2003 increments the slot number variable, and program control then returns to step S9002. In this manner, the assignment of the slot space address is completed for the slot in which is loaded external memory for which the designation of a slot space is arbitrary. Finally, when, at step S9002, the process for all the slots is completed, program control shifts at (3) to step S10001 in FIG. 10.

At step S10001, the MPU 2003 again initializes the above mentioned slot number variable to "1". At step S10002, the MPU 2003 compares the slot number variable $N_{SLT}$ with the total number of slots $N_{TTL}$. When the slot number variable $N_{SLT}$ is greater, the process for all the slots is terminated and the booting process is completed.

If, at step S10002, the MPU 2003 determines that the slot number variable $N_{SLT}$ is equal to or smaller than the total number of slots $N_{TTL}$, program control advances to step S10003. The MPU 2003 accesses the slot attribute 11001, in the slot attribute table that corresponds to the slot number that is set to the slot number variable, to determine whether or not the attribute 11001 indicates flash PROM in the initial state (0xFFFFFFFF). If the slot attribute 11001 does not indicate flash PROM in the initial state, program control goes to step S10008, whereat the slot number variable is incremented, and thereafter returns to step S10002.

When, at step S10003, the MPU 2003 determines that the slot attribute 11001 is for flash PROM in the initial state, at step S10004 the MPU 2003 accesses the slot space management table from the head in order to search for a slot space whose corresponding slot number 12000 is blank (0).

Following this, at step S10005, the slot space number for the blank slot space for which a search was performed is written in the slot space bit 5002, and the valid bit 5001 is set to "1". These data are held in the register that corresponds to the slot that is currently referred to (the slot that is set to the slot number variable), and the slot valid flag 11002 of the slot attribute table that corresponds to that slot is set to ON.

Then, at step S10006, the MPU 2003 writes the external memory header information 13001 into the flash PROM. The external memory attribute data 13003 are written in the slot space designation memory attribute (0x00000001), the header size 13004 is written in a 5×4 byte area=20 bytes, the slot space number 13005 is written in the slot space number that is designated at step S10005, and the priority and the bank number are written in a blank area of "0".

At step S10007, the MPU 2003 sets a current slot number to the corresponding slot number 12000 of the slot space management table. At step S10008 the MPU 2003 increments the slot number variable and program control returns to step S10002. In this manner, the assignment of the slot space address is completed to the slot in which flash PROM that is in the initial state is loaded, and the booting process for the slot is terminated.

(Second Embodiment)

A second embodiment will now be described by employing an LBP that has the same arrangement as that in the first embodiment. The booting process is performed as in the first embodiment. The bank switching process at the time of program execution, when the same slot space is assigned for a plurality of slots, will be explained while referring to the flowchart in FIG. 14.

Figure 14:
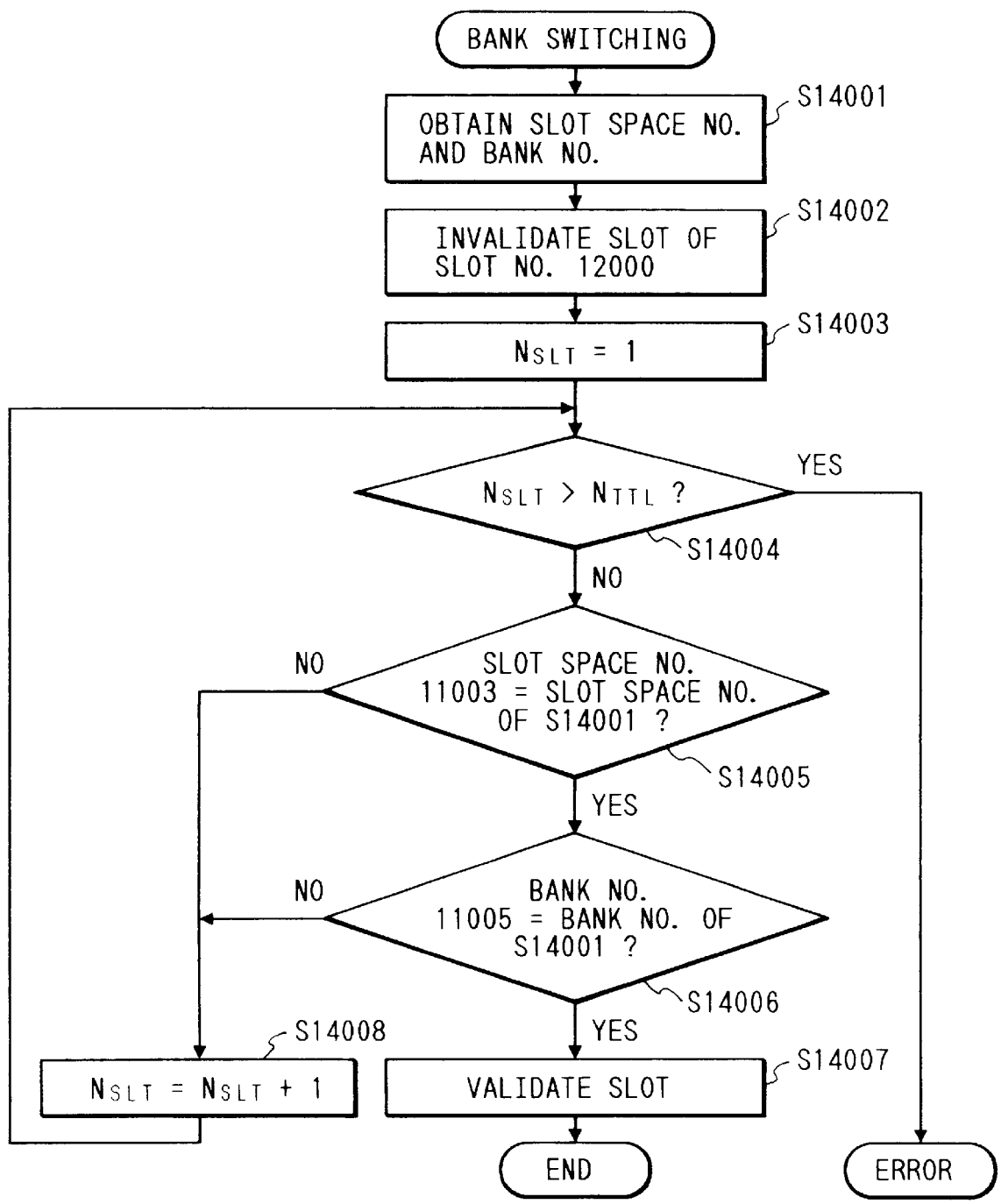
FIG. 14 is a flowchart showing the operational procedures, at the time of execution of a program, of a printing apparatus according to a second embodiment of the present invention.
Figure 15:
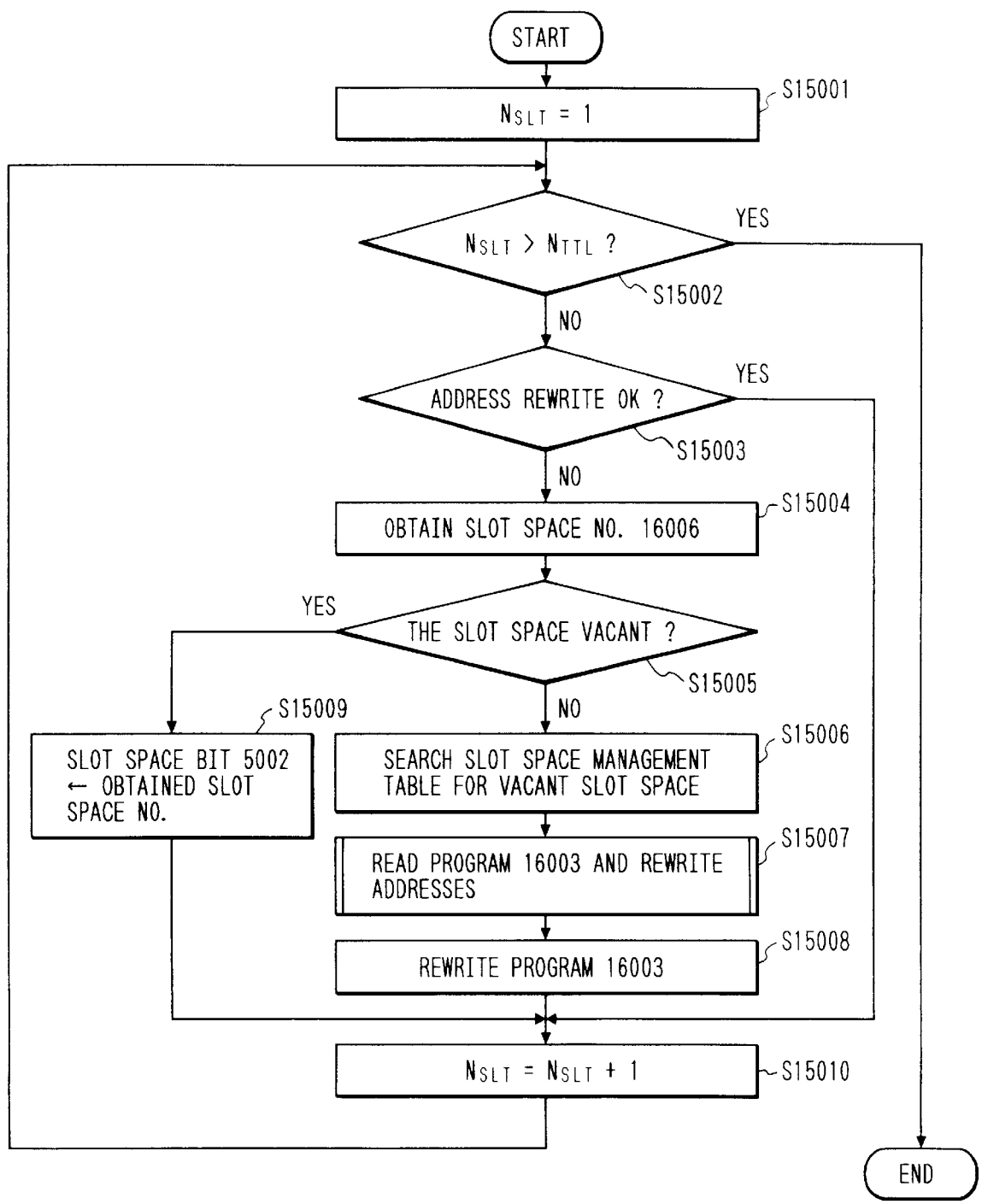
FIG. 15 is a flowchart showing the operational procedures, at the time of booting, of a printing apparatus according to the second embodiment and a third embodiment of the present invention.

As is described in the first embodiment, in the assignment of the same slot space for a plurality of slots, at the time of booting, the slot in which is loaded external memory whose priority is the highest has been assigned the slot space. To change the slot space number, in this embodiment a bank switching function, which is shown in the flowchart in FIG. 14, is called on when the program is to be executed. When the bank switching function is called, at step S14001 a slot space number that is to be changed and a bank number that is to be switched are acquired.

At step S14002, the MPU 2003 obtains the corresponding slot number 12000 that is set in the slot space management table that corresponds to the slot space number, which is acquired at step S14001. The valid bit 5001 of the register that corresponds to that slot is set to "0" to invalidate the slot, and the slot valid flag 11002 of the slot attribute table that corresponds to that slot is set to OFF.

Then, at step S14003, the MPU 2003 sets "1" as the initial value for the slot number variable $N_{SLT}$ in the RAM 2005, which is the program work area for the MPU 2003. At step S14004, the MPU 2003 compares the slot number variable $N_{SLT}$ with the total number of slots $N_{TTL}$. When the slot number variable $N_{SLT}$ is greater, the MPU 2003 determines that there is no slot that corresponds to a bank number that is to be switched, and terminates the process as an error.

If, at step S14004, the MPU 2003 determines that the slot number variable $N_{SLT}$ is equal to or smaller than the total number of slots $N_{TTL}$, program control advances to step S14005. The MPU 2003 accesses the slot space number 11003 of the slot attribute table that corresponds to the slot number that is set to the slot number variable $N_{SLT}$, and determines whether or not the slot space number 11003 matches the slot space number that is acquired at step S14001. When the two slot space numbers do not match, program control goes to step S14008, whereat the slot number variable is incremented, and returns to step S14004.

When, at step S14005, the MPU 2003 determines that the slot space numbers match, program control proceeds to step S14006. The MPU 2003 accesses the bank number 11005 of the slot attribute table that corresponds to the slot number that is set to the slot number variable, and determines whether or not the bank number 11005 matches the bank number that is acquired at step S14001. When these bank numbers do not match, program control goes to step S14008, whereat the slot number variable is incremented, and returns to step S14004.

If, at step S14006, the MPU 2003 determines that the two bank numbers match, at step S14007, the MPU 2003 sets to "1" the valid bit 5001 of the register for the slot that corresponds to the slot attribute table in which the bank number is matched at step S14007, validates the slot, and sets the slot valid flag 11002 of the slot attribute table to ON. The MPU 2003 also sets the corresponding slot number 12000 of the slot space management table, and thereafter terminates the bank switching.

As is described above, when a plurality of slots are allocated to the same slot space, the bank switching is performed by a program.

(Third Embodiment)

Figure 16:
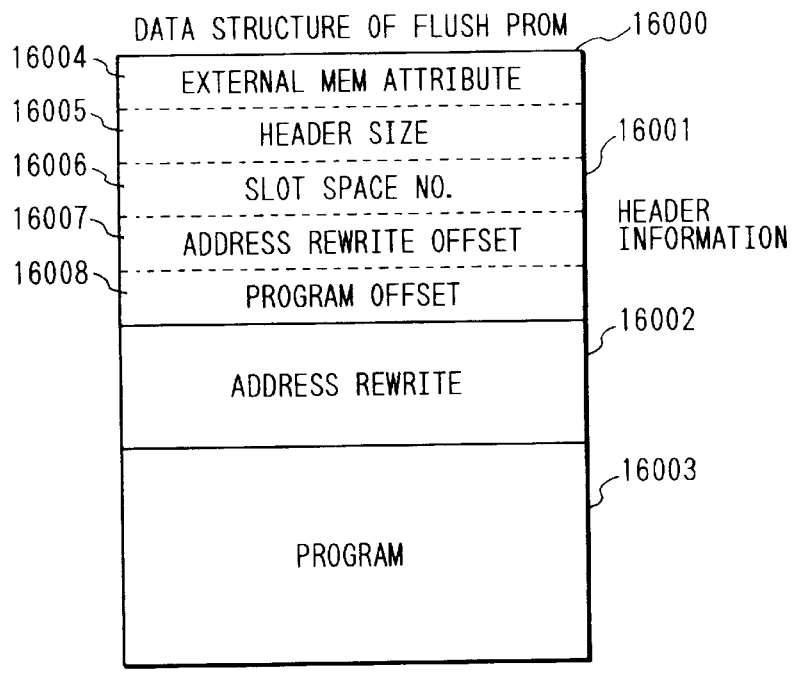
FIG. 16 is a diagram showing an example format for data in a flash PROM, which is one type of external memory device that is employed with the printing apparatus according to the second embodiment.

A third embodiment will now be explained by employing an LBP that has the same arrangement as that in the first embodiment. Data in flash PROM from among the external memory devices that are loaded in external memory slots have the following format, as is shown in FIG. 16.

A data format 16000 for flash PROM is constituted mainly by a flash PROM header information section 16001, an address rewrite information section 16002, and a program section 16003. The flash PROM header information section 16001 consists of an external memory attribute data 16004 that indicates address rewritable flash PROM (0x00000003), a header size 16005, a slot space number 16006 for which an address of a current program in the flash PROM is assigned, an offset 16007 to the address writing data 16002, and an offset 16008 to the program 16003.

Figure 17:
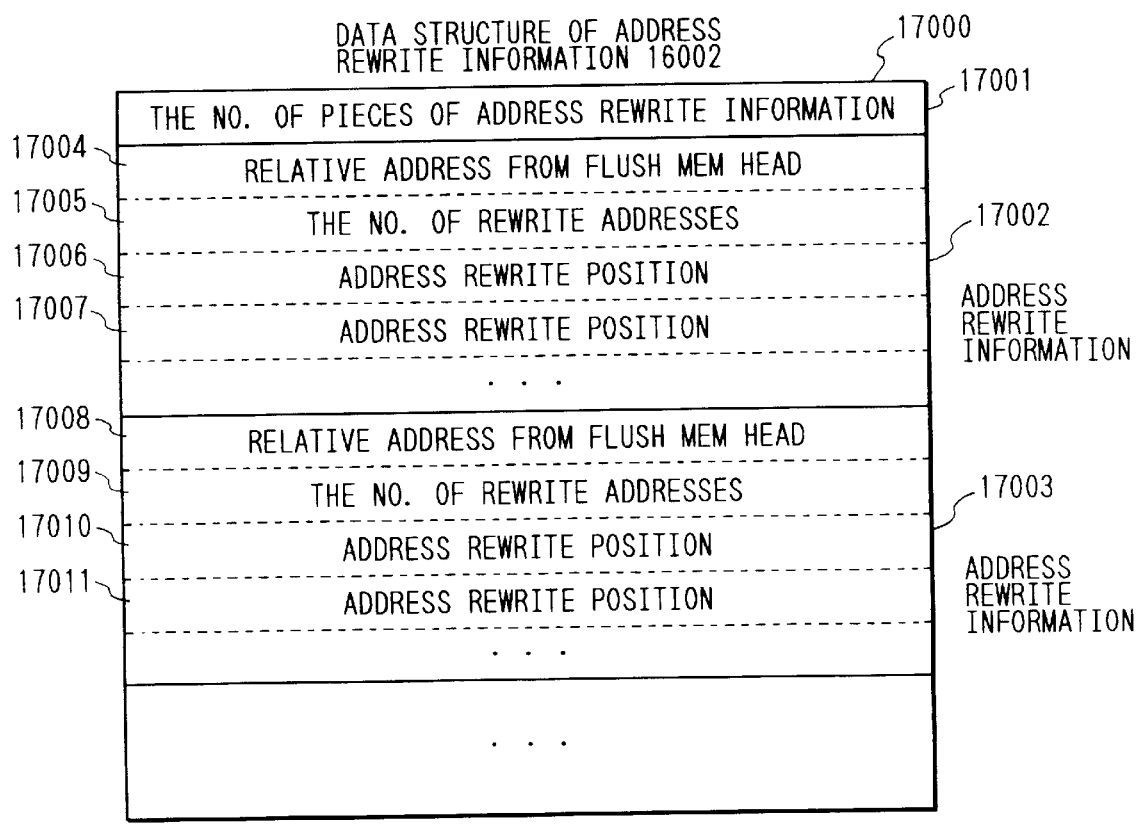
FIG. 17 is a diagram showing another example format for data in a flash PROM, which is one type of external memory device that is employed with the printing apparatus according to the second embodiment.

As is shown in a data structure 17000 in FIG. 17, the address rewrite information section 16002 includes the total number 17001 of pieces of address rewrite information, and address rewrite information 17002 and 17003 whose piece counts are equivalent to the total number 17001 of pieces of address rewrite information. The address rewrite information 17002 includes a relative rewrite address value 17004 for an absolute address that is offset from the flash memory head, the total number 17005 of stored absolute addresses to be written, and offset positions 17006 and 17007, for the rewrite absolute addresses from the head of the flash memory, that are equivalent to the number of stored absolute address values that are to be rewritten.

The third embodiment will now be explained in detail. The booting process is performed almost in the same manner as in the first embodiment. At step S7009 in FIG. 7 for the first embodiment, both flash PROM in the initial state (0xFFFFFFFF) and address rewritable flash PROM are determined by the MPU 2003 to be flash PROM. At step S7010, the attributes for both flash PROMs are set in the slot attribute 11001 in the slot attribute table.

Figure 10:
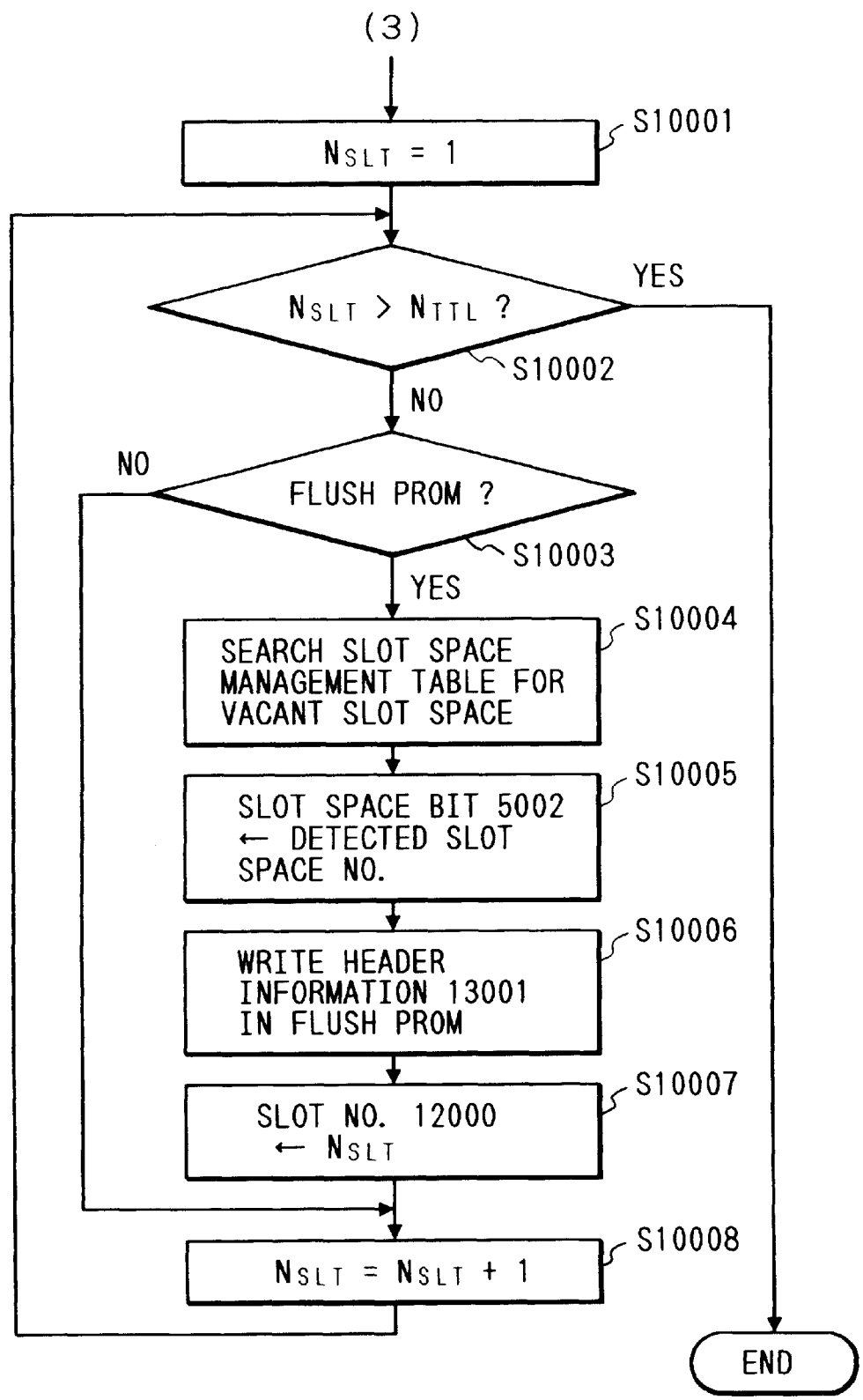
FIG. 10 is a flowchart showing the operational procedures, at the time of booting, of the printing apparatus according to the first embodiment of the present invention.

On the other hand, at step S10003 in FIG. 10, only flash PROM in the initial state (0xFFFFFFFF) is determined as flash PROM. In the third embodiment, when the booting process in the first embodiment is terminated, the booting process for address rewritable flash PROM is performed while referring to the flowchart in FIG. 15. First, at step S15001, "1" is set, as an initial value, for the slot number variable $N_{SLT}$ in the RAM 2005, for which is a program work area.

Following this, at step S15002, the MPU 2003 compares the slot number variable $N_{SLT}$ with the total number of slots $N_{TTL}$. When the slot number variable $N_{SLT}$ is grater, the booting process for the flash PROM where the addresses for all the slots can be rewritten is terminated.

If, at step S15002, the MPU 2003 determines that the slot number variable $N_{SLT}$ is equal to or smaller than the total number of slots $N_{TTL}$, program control proceeds to step S15003. The MPU 2003 accesses the slot attribute 11001 of the slot attribute table that corresponds to the slot number that is set to the slot number variable, and examines whether or not the attribute 11001 indicates an address writable flash PROM (0x00000003). If the slot attribute 11001 does not indicate address writable flash PROM, program control goes to step S15010, whereat the slot number variable is incremented, and returns to step S15002.

If, at step S15003, the MPU 2003 determines that the slot attribute 11001 indicates address writable flash PROM, at step S15004 the MPU 2003 acquires the slot space number 16006 that is included in the header information 16001 of the flash PROM. At step S15005, the MPU 2003 employs the slot management table to determine whether or not the slot space that is acquired at step S15004 is blank (0). When the slot space is blank (0), program control moves to step S15009. The slot space number that is acquired at step S15004 is set in the slot space bits 5002, and the valid bit 5001 is set to "1". These data are held in the register that corresponds to the slot that is currently being referred to (the slot that is set in the number variable), and the slot valid flag 11002 of the slot attribute table that corresponds to that slot is set to ON. Program control then proceeds to step S15010, whereat the slot number variable is incremented, and returns to step S15002.

If, at step S15005, the MPU 2003 determines that the slot space is not blank, at step S15006 the MPU 2003 accesses the slot management table from the head in order to search for a slot space for which the corresponding slot number 12000 indicates the blank state (0). The slot space number of the blank slot space that was searched for is set to the slot space bits 5002, and the valid bit 5001 is set to "1". These data are held in the register for the slot that is currently being referred to (the slot that is set to the slot number variable), and the slot valid flag 11002 of the slot attribute table that corresponds to that slot is set to ON.

Sequentially, at step S15007, the MPU 2003 reads the program section 16003 into the RAM 2005, which is the program work area. The MPU 2003 employs the information in the address write information section 16002 in the flash PROM, to rewrite the address data in the program that is read in the RAM 2005 into the data that correspond to a new slot space. The process at step S15007 will be described in detail later while referring to the flowchart in FIG. 18.

Then, at step S15008 the MPU 2003 employs the program for which the address has been written in the RAM 2005 to write the program section 16003 in the flash PROM, and rewrites the slot space number 16006 from the flash PROM header information section 16001 into a new slot space number. Program control then advances to step S15010, whereat the slot number variable is incremented, and returns to step S15002.

Figure 18:
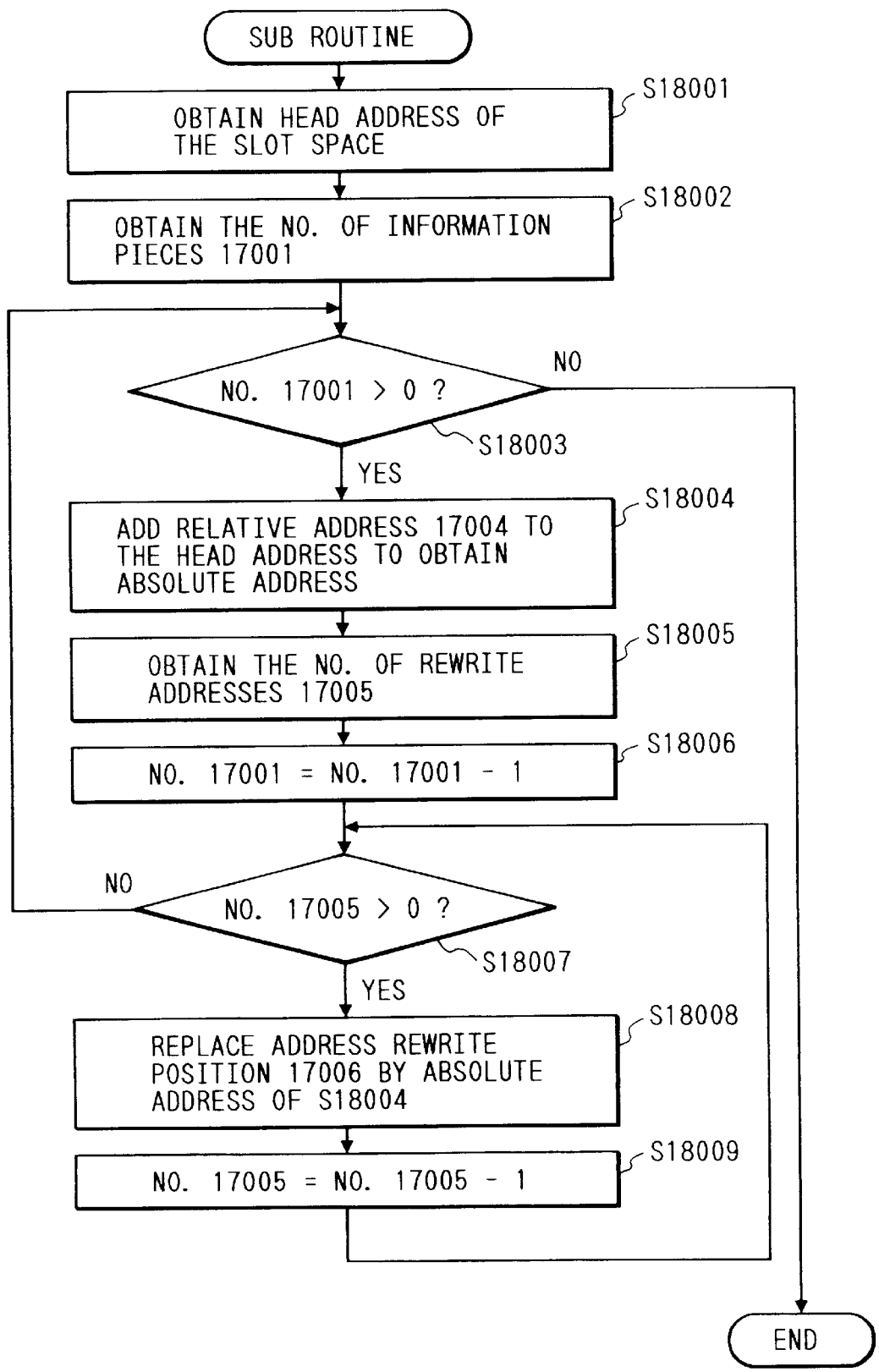
FIG. 18 is a flowchart showing the operational procedure, at the time of booting, of a printing apparatus according to the third embodiment of the present invention.

The detailed processing at step S15007 will now be explained while referring to the flowchart in FIG. 18. At step S18002, the MPU 2003 acquires the head address for the slot space that is newly assigned. Then, the MPU 2003 obtains the total pieces 17001 of address rewrite information from the address write information section 16002 in the flash PROM. At step S18003, the MPU 2003 examines whether the total pieces 17001 of address rewrite information is greater than 0. If the total number 17001 is equal to or smaller than 0, the MPU 2003 assumes that the process is terminated, and completes the subroutine.

If, at step S18003, the MPU 2003 determines that the total number 17001 of the address rewrite information pieces is greater than 0, at step S18004, the head address of the newly assigned slot space that is acquired at step S18001 is added to the relative rewrite address 17004 in the address rewrite information 17002, so that a new absolute address for a rewrite address is acquired.

Following this, at step S18005, the MPU 2003 acquires the total number 17005 of addresses to be written in the address write information 17002. At step S18006, the total pieces of address write information is decremented. At step S18007, a check is performed to determine whether or not the total number 17005 of addresses to be written is greater than 0. If the total number 17005 of addresses to be written is 0 or smaller, it is assumed that the writing process for the address is completed, and program control returns to step S18003.

When, at step S18007, the MPU 2003 determines that the total number 17005 of addresses to be written is greater than 0, at step S18008, the address rewrite position 17006 in the address rewrite information 17002 is acquired. Beginning with the head of the program that is copied onto the RAM 2005, the MPU 2003 rewrites an address at an offset position, which is designated by the address rewrite position data, into a new absolute rewrite address that is acquired at step S18004.

Sequentially, at step S18009, the MPU 2003 decrements the total number 17005 of addresses to be written, and program control returns to step S18007. Through the above described process, the address in the program section of the flash PROM can be rewritten so as to match a slot space address that is assigned for a slot in which the flash PROM is loaded. Although an explanation for this embodiment has been given by employing an LBP, any printer, such as an ink-jet printer, a thermal wax-transfer printer, a thermal transfer printer of sublimation type, an LED printer, or a liquid crystal shutter printer, may be employed that has a plurality of slots for external memory. In addition to such printers, other devices, such as personal computers and other computers, that have a plurality of slots for external memory may be employed.

Although in this embodiment, a ROM has been employed as an external memory device, any other external memory device that is loaded into a slot and that has an address may be employed. Further, although in this embodiment, flash PROM has been used as a programmable nonvolatile external memory device, any other external programmable nonvolatile memory device, such as an EEPROM or a RAM that has a backup power source, may be used that is loaded in a slot and that has an address.

As is described above, according to the embodiments, without performing bank switching and without using the PIC and PID functions, an external memory device in which are stored data that rely on an address can be loaded in a desired slot among a plurality of slots, and can be accessed.

What is claimed is:

1. A control apparatus comprising:
   a plurality of slot means each for connecting an external memory to said control apparatus;
   access means for accessing an external memory connected by one of said plurality of slot means to read identification information stored in the external memory;
   determination means for determining whether or not data that rely on an address are stored in the external memory, based on the identification information stored in the external memory connected by said one slot means; and
   address setting means for setting an address of the external memory connected by said one slot means at which said access means accesses that external memory in accordance with a determination made by said determination means.

2. A control apparatus comprising:
   a plurality of slot means each for connecting an external memory to said control apparatus;
   access means for accessing an external memory connected by one of said plurality of slot means;
   recognition means for recognizing identification information stored in the external memory connected by said one slot means;
   address setting means for setting an address of the external memory connected by said one slot means at which said access means accesses that external memory, on the basis of the identification information recognized by said recognition means; and
   memory means for storing at least one pair of (1) identification information of an external memory and (2) an address of the external memory in correspondence to each other, wherein said address setting means sets the address of the external memory connected by said one slot means at which said access means accesses that external memory by reading from said memory means the address stored in correspondence to the identification information of that external memory recognized by said recognition means.

3. A control apparatus according to claim 2, further comprising:
   determination means for determining whether an address of the external memory connected by said one slot means may be set arbitrarily; and
   control means for controlling said address setting means to set the address of the external memory connected by said one slot means at which said access means accesses that external memory, (a) on the basis of the identification information recognized by said recognition means if said determination means determines that the address may not be set arbitrarily, or (b) arbitrarily if said determination means determines that the address may be set arbitrarily.

4. A control apparatus according to claim 3, wherein, if a first one of said plurality of slot means connects to said apparatus a first external memory in which its address may be set arbitrarily and a second one of said plurality of slot means connects to said apparatus a second external memory in which its address may not be set arbitrarily, said control means controls said address setting means to (a) set the address of the second external memory on the basis of the identification information recognized by said recognition means at a certain area of said address setting means and thereafter (b) set the address of the first external memory arbitrarily at a remaining free area of said address setting means.

5. A control apparatus according to claim 4, wherein the first external memory stores information comprising font information.

6. A control apparatus according to claim 4, wherein the second external memory stores information comprising program information.

7. A control apparatus comprising:
   a plurality of slot means each for connecting an external memory to said control apparatus;
   access means for accessing an external memory connected by one of said plurality of slot means;
   recognition means for recognizing identification information stored in the external memory connected by said one slot means;
   address setting means for setting an address of the external memory connected by said one slot means at which said access means accesses that external memory, on the basis of the identification information recognized by said recognition means;
   determination means for determining whether the external memory connected by said one slot means is a nonvolatile memory into which its initial condition can be written; and
   control means for controlling said address setting means to set the address of the external memory connected by said one slot means at which said access means accesses that external memory according to a determination by said determination means.

8. A control apparatus according to claim 7, wherein said control means controls said address setting means to set the address of the external memory connected by said one slot means at which said access means accesses that external memory, (a) on the basis of the identification information recognized by said recognition means if said determination means determines that the external memory is not a nonvolatile memory into which its initial condition can be written or (b) on the basis of information independent of the recognized identification information if said determination means determines that the external memory is a nonvolatile memory into which its initial condition can be written.

9. A method for controlling an apparatus to which plural external memories can be connected using plural respective slot means, comprising the steps of:
   accessing an external memory connected by one of the slot means to read identification information stored in the external memory;

determining whether or not data that rely on an address are stored in the external memory, based on the identification information stored in the external memory connected by the one slot means; and setting an address of the external memory connected by the one slot means at which that external memory is accessed in accordance with a determination made in said determining step.

10. A method for controlling an apparatus to which plural external memories can be connected using plural respective slot means, comprising the steps of:

accessing an external memory connected by one of the slot means;

recognizing identification information stored in the external memory connected by the one slot means;

setting an address of the external memory connected by the one slot means at which that external memory is accessed, on the basis of the identification information recognized in said recognizing step;

storing, in a memory means, at least one pair of (1) identification information of an external memory and (2) an address of the external memory in correspondence to each other, wherein said address setting step includes setting the address of the external memory connected by the one slot means at which that external memory is accessed by reading from the memory means the address stored in correspondence to the identification information of that external memory recognized in said recognizing step.

11. A control method according to claim 10, further comprising the steps of:

determining whether an address of the external memory connected by the one slot means may be set arbitrarily; and controlling performance of said address setting step to set the address of the external memory connected by the one slot means at which that external memory is accessed, (a) on the basis of the identification information recognized in said recognizing step if it is determined in said determining step that the address may not be set arbitrarily, or (b) arbitrarily if it is determined in said determining step that the address may be set arbitrarily.

12. A control method according to claim 11, wherein, if a first one of the slot means connects to the apparatus a first external memory in which its address may be set arbitrarily and a second one of the slot means connects to the apparatus a second external memory in which its address may not be set arbitrarily, said controlling step includes controlling performance of said address setting step to (a) set the address of the second external memory on the basis of the identification information recognized in said recognizing step at a certain area of an address setting means used in performing said address setting step, and thereafter (b) set the address of the first external memory arbitrarily at a remaining free area of the address setting means.

13. A control method according to claim 12, wherein the first external memory stores information comprising font information.

14. A control method according to claim 12, wherein the second external memory stores information comprising program information.

15. A method for controlling an apparatus to which plural external memories can be connected using plural respective slot means, comprising the steps of:

accessing an external memory connected by one of the slot means;

recognizing identification information stored in the external memory connected by the one slot means;

setting an address of the external memory connected by the one slot means at which that external memory is accessed, on the basis of the identification information recognized in said recognizing step;

determining whether the external memory connected by the one slot means is a nonvolatile memory into which its initial condition can be written; and controlling performance of said address setting step to set the address of the external memory connected by the one slot means at which that external memory is accessed according to a determination made in said determining step.

16. A control method according to claim 15, wherein said controlling step includes controlling performance of said address setting step to set the address of the external memory connected by the one slot means at which that external memory is accessed, (a) on the basis of the identification information recognized in said recognizing step if it is determined in said determining step that the external memory is not a nonvolatile memory into which its initial condition can be written or (b) on the basis of information independent of the recognized identification information if it is determined in said determining step that the external memory is a nonvolatile memory into which its initial condition can be written.

17. A memory medium storing instructions or program code for causing a programmable apparatus to perform a method for controlling an apparatus to which plural external memories can be connected using plural respective slot means, comprising the steps of:

accessing an external memory connected by one of the slot means to read identification information stored in the external memory;

determining whether or not data that rely on an address are stored in the external memory, based on the identification information stored in the external memory connected by the one slot means; and setting an address of the external memory connected by the one slot means at which that external memory is accessed in accordance with a determination made in said determining step.

18. A memory medium storing instructions or program code for causing a programmable apparatus to perform a method for controlling an apparatus to which plural external memories can be connected using plural respective slot means, comprising the steps of:

accessing an external memory connected by one of the slot means;

recognizing identification information stored in the external memory connected by the one slot means;

setting an address of the external memory connected by the one slot means at which that external memory is accessed, on the basis of the identification information recognized in said recognizing step;

storing, in a memory means, at least one pair of (1) identification information of an external memory and (2) an address of the external memory in correspondence to each other, wherein said address setting step includes setting the address of the external memory connected by the one slot means at which that external memory is accessed by reading from the memory means the address stored in correspondence to the identification information of that external memory recognized in said recognizing step.

19. A memory medium according to claim 18, wherein the method further comprises the steps of:

determining whether an address of the external memory connected by the one slot means may be set arbitrarily; and controlling performance of said address setting step to set the address of the external memory connected by the one slot means at which that external memory is accessed, (a) on the basis of the identification information recognized in said recognizing step if it is determined in said determining step that the address may not be set arbitrarily, or (b) arbitrarily if it is determined in said determining step that the address may be set arbitrarily.

20. A memory medium according to claim 19, wherein, if a first one of the slot means connects to the apparatus a first external memory in which its address may be set arbitrarily and a second one of the slot means connects to the apparatus a second external memory in which its address may not be set arbitrarily, said controlling step includes controlling performance of said address setting step to (a) set the address of the second external memory on the basis of the identification information recognized in said recognizing step at a certain area of an address setting means used in performing said address setting step, and thereafter (b) set the address of the first external memory arbitrarily at a remaining free area of the address setting means.

21. A memory medium according to claim 20, wherein the first external memory stores information comprising font information.

22. A memory medium according to claim 20, wherein the second external memory stores information comprising program information.

23. A memory medium storing instructions or program code for causing a programmable apparatus to perform a method for controlling an apparatus to which plural external memories can be connected using plural respective slot means, comprising the steps of:

accessing an external memory connected by one of the slot means;

recognizing identification information stored in the external memory connected by the one slot means;

setting an address of the external memory connected by the one slot means at which that external memory is accessed, on the basis of the identification information recognized in said recognizing step;

determining whether the external memory connected by the one slot means is a nonvolatile memory into which its initial condition can be written; and controlling performance of said address setting step to set the address of the external memory connected by the one slot means at which that external memory is accessed according to a determination made in said determining step.

24. A memory medium according to claim 23, wherein said controlling step includes controlling performance of said address setting step to set the address of the external memory connected by the one slot means at which that external memory is accessed, (a) on the basis of the identification information recognized in said recognizing step if it is determined in said determining step that the external memory is not a nonvolatile memory into which its initial condition can be written or (b) on the basis of information independent of the recognized identification information if it is determined in said determining step that the external memory is a nonvolatile memory into which its initial condition can be written.

* * * * *

UNITED STATES PATENT AND TRADEMARK OFFICE
CERTIFICATE OF CORRECTION

PATENT NO.   : 5,911,147

DATED        : June 8, 1999

INVENTOR(S)  : KEN ONODERA, ET AL.

It is certified that error appears in the above-identified patent and that said Letters Patent is hereby corrected as shown below:

On the title page, item

[56] REFERENCES CITED

U.S. PATENT DOCUMENTS

Insert:
--5,491,830  2/96  Ferri .............. 395/829
  5,412,798  5/95  Garney ............. 395/500
  5,276,831  1/94  Nakanishi et al. ... 395/425
  4,388,707  6/83  Komatsu et al. ..... 365/230
  5,513,331  4/96  Pawlowski et al. ... 395/401--.

COLUMN 1

Line 39, "can not" should read --cannot--.

COLUMN 2

Line 38, "they" should read --there--.

COLUMN 3

Line 47, "a external" should read --an external--.

UNITED STATES PATENT AND TRADEMARK OFFICE
CERTIFICATE OF CORRECTION

PATENT NO.      : 5,911,147

DATED           : June 8, 1999

INVENTOR(S)     : KEN ONODERA, ET AL.

It is certified that error appears in the above-identified patent and that said Letters Patent is hereby corrected as shown below:

COLUMN 4

Line 53, "cross sectional" should read --cross-sectional--.

COLUMN 5

Line 49, "cross sectional" should read --cross-sectional--.

COLUMN 9

Line 21, "OFF." should read --to OFF.--.

COLUMN 13

Line 29, "for which is" should read --which is--; and
Line 33, "grater," should read --greater,--.

UNITED STATES PATENT AND TRADEMARK OFFICE
CERTIFICATE OF CORRECTION

PATENT NO.    : 5,911,147

DATED         : June 8, 1999

INVENTOR(S)   : KEN ONODERA, ET AL.

It is certified that error appears in the above-identified patent and that said Letters Patent is hereby corrected as shown below:

COLUMN 14

Line 28, "total" should read --total number of--;
Line 31, "total" should read --total number of--; and
Line 44, "total" should read --total number of--.

Signed and Sealed this

Eighteenth Day of January, 2000

Attest:

Q. TODD DICKINSON

Attesting Officer

Commissioner of Patents and Trademarks